Oct. 9, 1956  A. S. KINSINGER  2,765,724
MEANS CONNECTING A TOOL STANDARD WITH A PLOW BEAM
Filed March 13, 1950  6 Sheets-Sheet 1
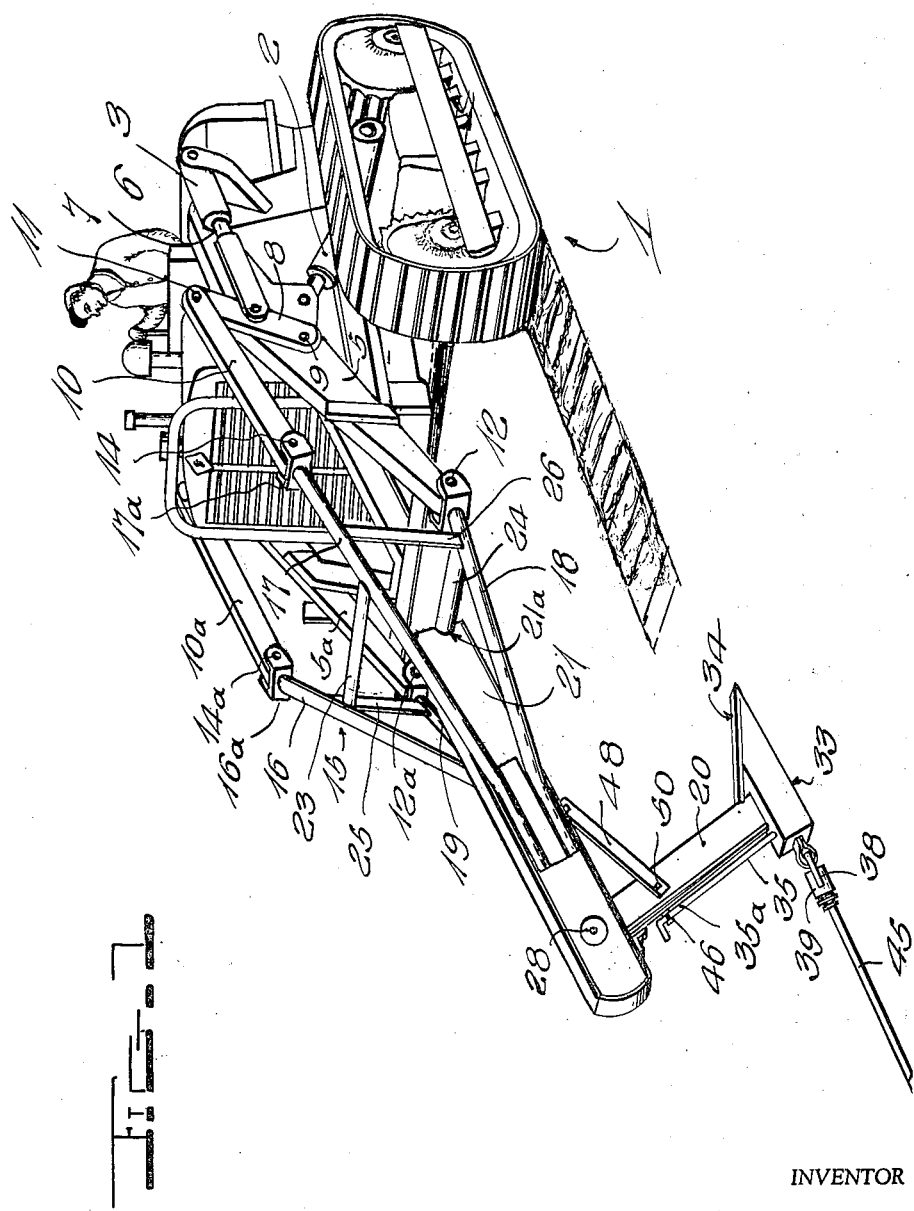
INVENTOR
Andrew S. Kinsinger,
BY John Q. Brady
ATTORNEY

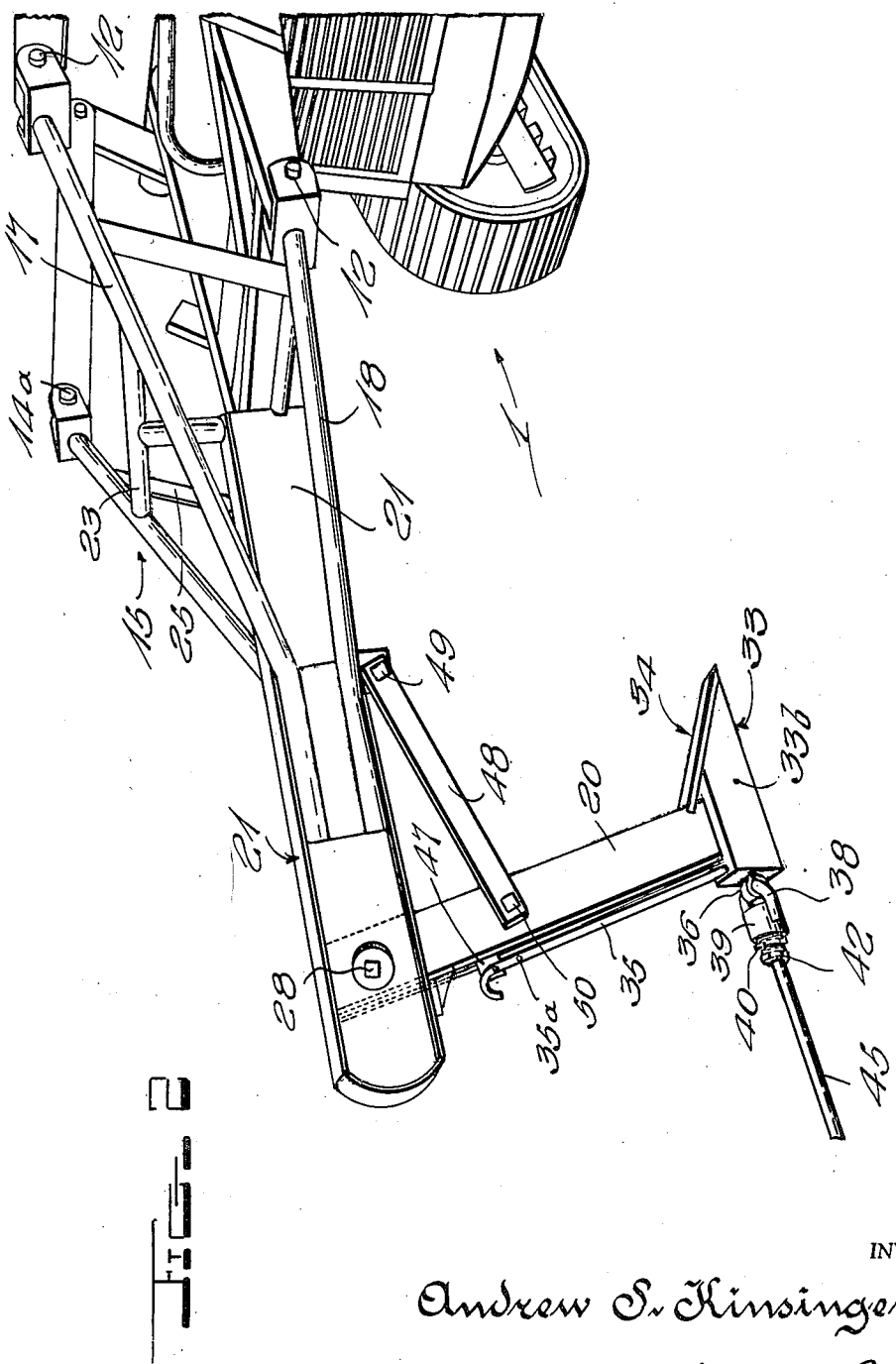

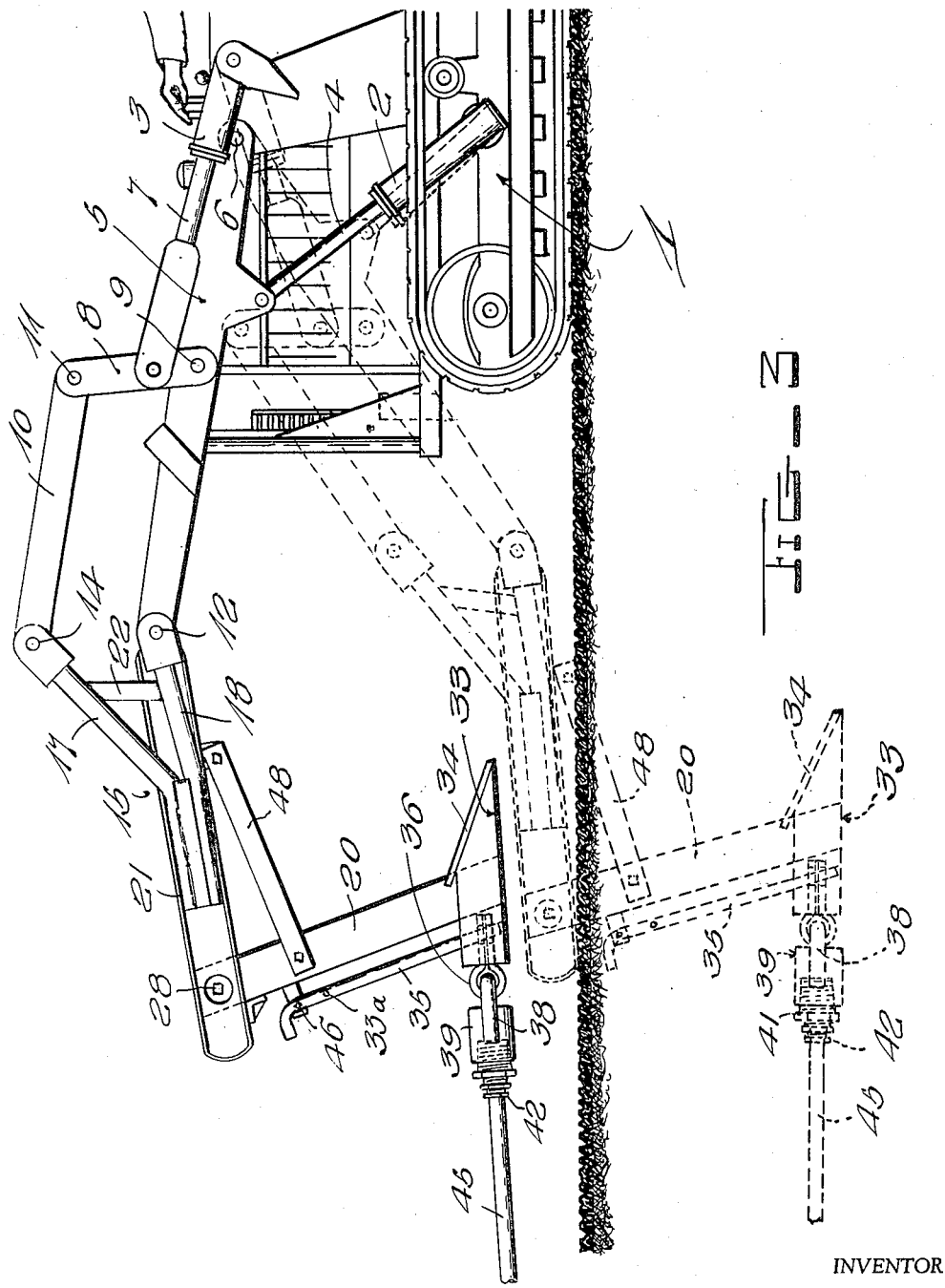

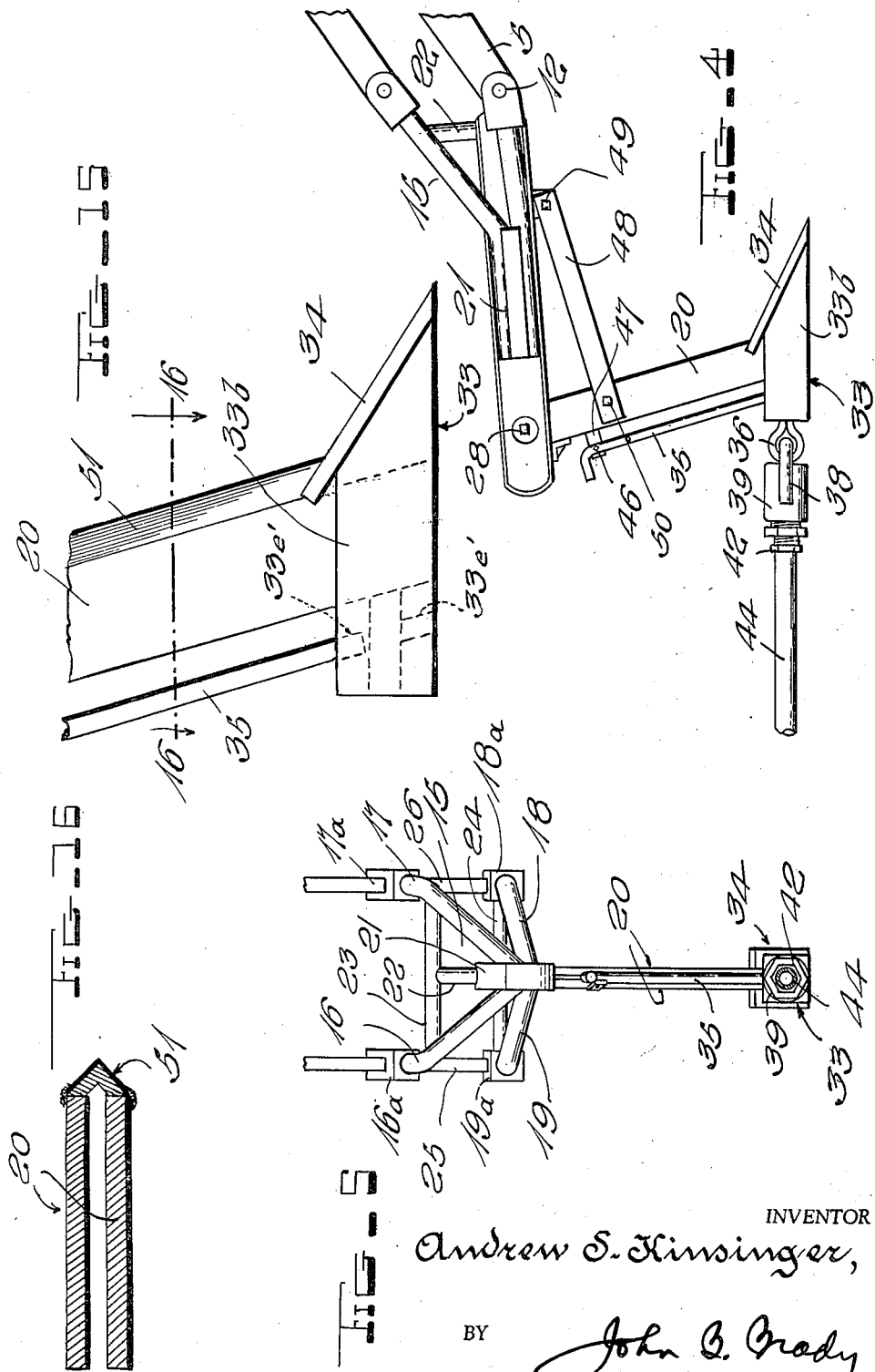

Oct. 9, 1956       A. S. KINSINGER       2,765,724
MEANS CONNECTING A TOOL STANDARD WITH A PLOW BEAM
Filed March 13, 1950       6 Sheets-Sheet 5
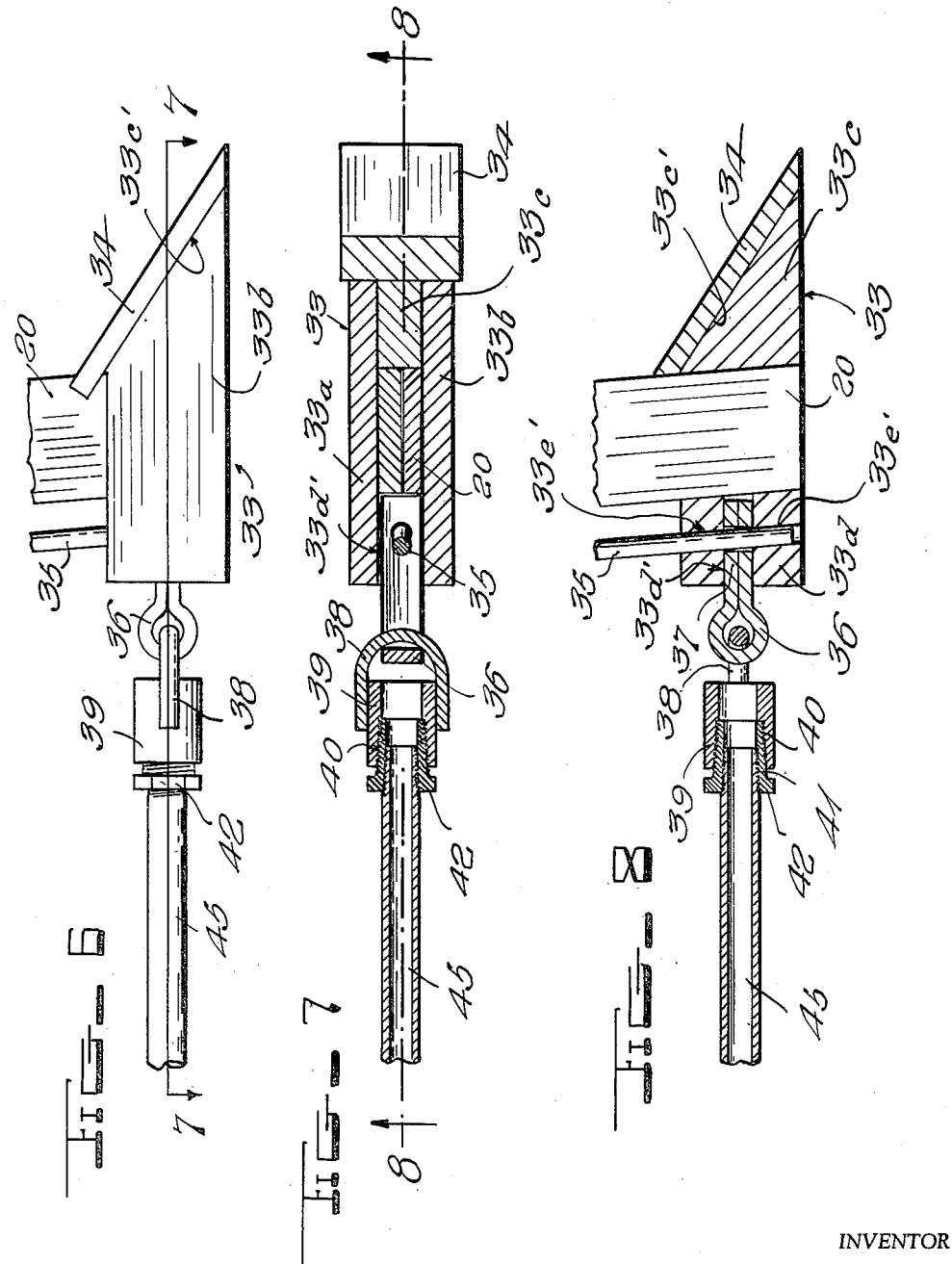
INVENTOR
Andrew S. Kinsinger,
BY John B. Brady
ATTORNEY Oct. 9, 1956 A. S. KINSINGER 2,765,724
MEANS CONNECTING A TOOL STANDARD WITH A PLOW BEAM
Filed March 13, 1950 6 Sheets-Sheet 6
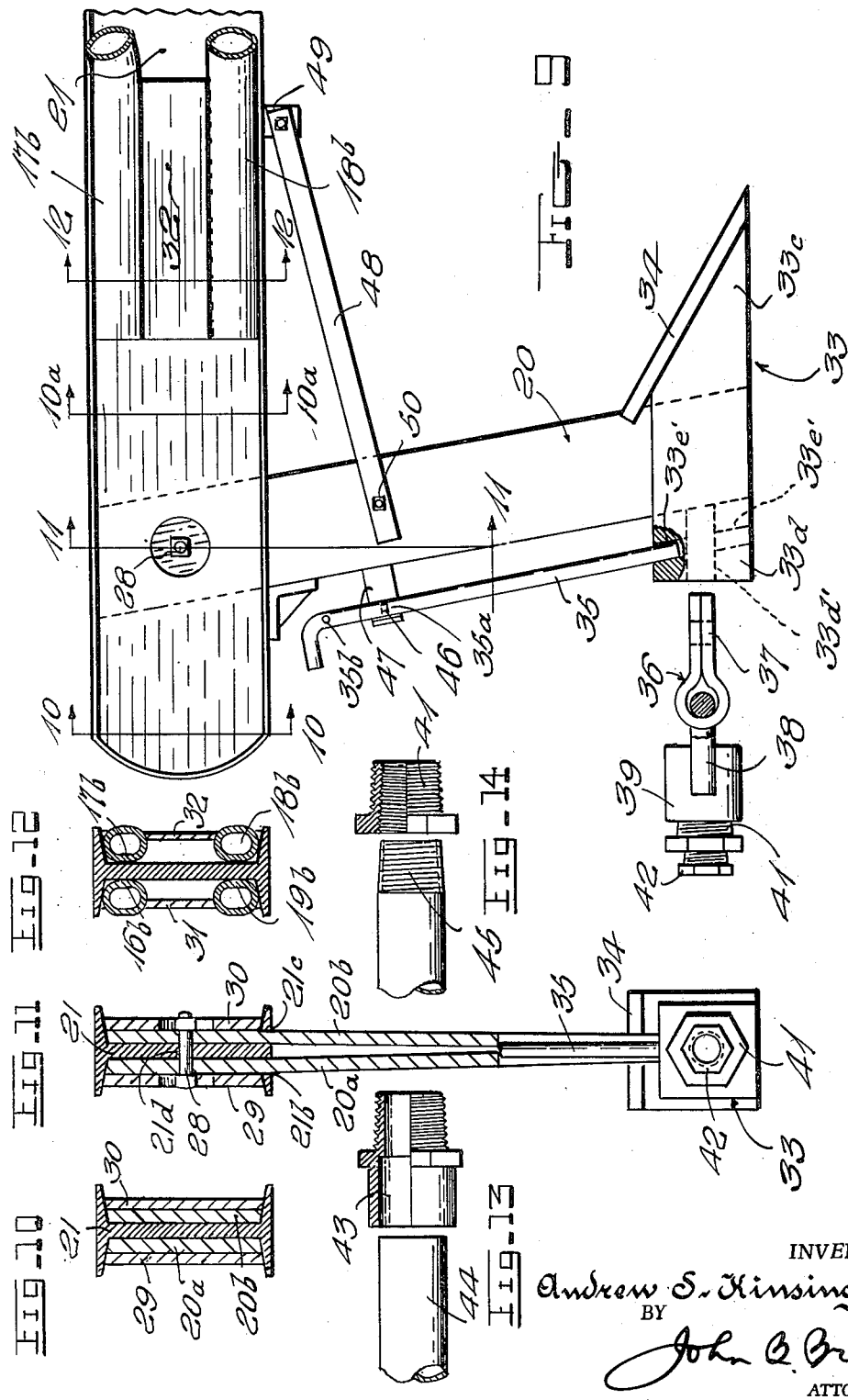
INVENTOR.
Andrew S. Kinsinger,
BY
John C. Brady
ATTORNEY United States Patent Office 2,765,724
Patented Oct. 9, 1956

2,765,724

MEANS CONNECTING A TOOL STANDARD WITH A PLOW BEAM

Andrew S. Kinsinger, Gordonville, Pa.

Application March 13, 1950, Serial No. 149,379

3 Claims. (Cl. 97—198.1)

My invention relates broadly to machines for laying pipe in the earth and more particularly to a mole plow for simultaneously forming a trench and laying a pipe therein.

One of the objects of my invention is to provide a construction of machine for laying pipe in the earth which is rugged and capable of withstanding severe strains encountered in simultaneously forming a trench in the earth and laying a pipe therein.

Another object of my invention is to provide an arrangement for connecting a beam and tool standard in a trench digging machine whereby strains imposed upon the tool of the trench digging machine are resisted.

Still another object of my invention is to provide a structural assembly for connecting a tool with the beam of a trench digging machine in which reinforcement means are provided between the beam and the tool for insuring a structural connection therebetween capable of resisting severe strains imposed upon the tool during operation of the machine.

Other and further objects of my invention reside in the structural arrangement of earth forming and pipe pulling mechanism for attachment to tractors as set forth more fully in the specification hereinafter following by reference to the following specification and the accompanying drawings in which:

Figure 1 is a perspective view of the pipe laying machine of my invention and illustrating the machine in operation in pulling a pipe; Fig. 2 is an enlarged view of the beam and the pipe pulling mechanism associated therewith; Fig. 3 is a side elevational view showing the machine of my invention with the pipe laying mechanism shown in full lines in elevated position, and in dotted lines in position for simultaneously forming the trench and laying the pipe; Fig. 4 is a detail view of the trench forming mechanism and pipe laying mechanism coupled therewith; Fig. 5 is an end view of the assembly shown in Fig. 4; Fig. 6 is a side elevational view of the earth forming mechanism and pipe laying mechanism coupled therewith; Fig. 7 is a horizontal sectional view taken substantially on line 7—7 of Fig. 6; Fig. 8 is a vertical sectional view taken substantially on line 8—8 of Fig. 7; Fig. 9 is an enlarged view of the trench forming mechanism showing the pipe laying mechanism in juxtaposition with relation thereto, the view illustrating the uncoupled relationship of the pipe laying mechanism with respect to the trench forming mechanism; Fig. 10 is a vertical sectional view taken substantially on lines 10—10 or 10a—10a of Fig. 9; Fig. 11 is a vertical sectional view taken substantially on line 11—11 of Fig. 9; Fig. 12 is a vertical sectional view taken substantially on line 12—12 of Fig. 9; Fig. 13 shows the application of the coupling mechanism of my invention to pipe which is fastened to the coupling device preparatory to the pulling operation; Fig. 14 shows the coupling mechanism applied to steel pipe employing a threaded connection between the pipe and the coupling mechanism; Fig. 15 is an enlarged fragmentary side elevational view of the incision tool in which the leading edge of the depending support for the tool is provided with a shearing blade which facilitates movement of the tool through the ground; and Fig. 16 is a transverse sectional view taken substantially on line 16—16 of Fig. 15.

My invention is directed to a composite trench forming and pipe laying machine in which standard pipe may be drawn through the earth without the necessity of excavating a conventional trench preparatory to a pipe laying operation. I provide an earth forming mechanism of relatively slender characteristics which lends itself to penetration of the earth readily as the mechanism is drawn forward. The trench forming mechanism includes a vertically extending beam terminating in a plow shoe at its lower end and connected at its upper end with the beam which is drawn forward by the tractor.

I provide substantial bracing for the assembly for withstanding very substantial strains encountered for penetrations of depths of the order of thirty inches into the earth. The plow shoe forming the terminus for the device is provided with coupling means at the rear thereof for providing detachable connection with a loop device which forms a swivel connection with a bail connected with a coupling sleeve which includes connection means for the pipe which is to be drawn through the earth. Various forms of coupling constructions may be employed depending upon whether the pipe to be laid is copper, brass, aluminum, etc., having a plane tubular end, or whether the pipe is standard steel pipe screw-threaded on the end thereof.

I have found the structure of my invention highly practicable and successful in operation in performing pipe laying operations rapidly and with minimum expenditure of labor and with very substantial incidental savings in cost.

The plow shoe is designed to loosen the earth at depths for example to the extent of approximately thirty inches and the coupling mechanism attached to the rear of the shoe may pull, according to work already performed to date, as much as approximately 700 feet of 1½ inch pipe. I have successfully laid steel pipe of a length of approximately 700 feet in length comprising 21 foot sections coupled together with standard coupling sleeves and have pulled the approximate 700 feet length of pipe without the preliminary operation normally required of excavating a trench preparatory to the laying of the pipe. I have used the machine of my invention on numerous occasions for the successful laying of pipes of shorter lengths of the order of, for example, 150 feet and 200 feet, and other lengths. Conditions of the calculated strains involved in pipe laying operations convinces me that application of the machine of my invention to the laying of 1 inch steel or other pipe of lengths of 1000 feet are entirely practical without the preliminary operation of excavating a conventional trench. My reference to lengths of pipe relate to total load length which the machine pulls simultaneously with the forming of the trench and it is understood that repeat operations may be readily performed so that cross county and state laying operations are entirely practical employing the machine of my invention, the pulling lengths of pipe being connected together through conventional unions. A ten-ton tractor has been used in these operations. The problem involved is the opening of an incision or trench in the earth which may be of the order of the thirty inch depth and simultaneously pulling the pipe of the order of lengths heretofore referred to. These operations involve strains of such magnitude that considerable experimentation, design, and development has been required in the production of the machine of my invention. The mechanism illustrated herein is the result of an extensive development and while I have shown a preferred embodiment of the invention I realize that modifications may be made and I desire that the disclosure herein be considered in the illustrative sense and not as limiting my invention to the particular construction shown.

Referring to the drawing in detail, character 1 designates a tractor of the crawler type on which there is mounted a hydraulic lift comprising the elevating cylinders designated at 2 and the tilt cylinders represented at 3 located on each side of the chassis. The elevating cylinders 2 connect through jack rod 4 with beam 5 pivoted at 6 on the chassis. The tilting cylinders 3 connect through jack rods 7 with the links 8 pivoted at 9 between beams 5 and beams 10 at 11. The spaced beams 5 and 10 are provided with pivots 12 and 14 at their extremities respectively. The arrangement is symmetrical on each side of the machine and for purposes of explanation I have shown corresponding links 5a and 10a in Fig. 1 with pivots 12a and 14a thereon corresponding to pivots 12 and 14 as illustrated in Fig. 1. These pivots constitute the connecting means for the frame 15 which carries the mechanism of my invention.

The frame 15 has been shown more clearly in Figs. 2 and 5. Frame 15 includes a quadrilateral support constituted by connecting rods 16, 17, 18 and 19, terminating in yokes 16a, 17a, 18a and 19a which connect respectively with the pivots 14a, 14, 12 and 12a in the links 10a, 10 and 5 and 5a, leading to the raising and lowering mechanism on the tractor as heretofore explained.

The assembly 15 is very substantially braced from the quadrilateral connections with the beams leading to the tractor to the depending member 20. This bracing includes the central beam 21 which is of I-beam construction, having its forward extending end braced through member 22 and cross-brace 23 with the frame members 16 and 17. The lower portion of the I-beam has the web thereof recessed at 21a to engage the cross-beam 24, extending transversely between frame members 18 and 19. The forward ends of frame members 16, 17, 18 and 19 are welded to the sides of the web of I-beam 21 as represented more particularly in Fig. 12 at 16b, 17b, 18b and 19b forming a rigid support capable of withstanding extremely severe stresses. The frame members 16 and 19 are further braced by the strut 25, while frame members 17 and 18 are braced by the strut 26 insuring a high degree of rigidity to the frame.

The depending member 20 is formed from tempered or hard pressed steel so that it possesses a very high degree of shear strength and is capable of withstanding the relatively great strains to which it is subjected in the pulling operations. The depending member 20 is formed by a pair of flat plate members shown more clearly in Fig. 11 at 20a and 20b which are fastened on opposite sides of the central web of I-beam 21 and which pass through slots 21b and 21c formed in opposite sides thereof. The plates 20a and 20b are secured by bolt member 28 which extends transversely through a central aperture 21d in the web. The bolt 28 is fastened to the I beam 21 through apertures provided in the side plates 29 and 30 welded to opposite sides of the I beam 21. The side plates 29 and 30 extend to a position abutting the ends of the frame members 16, 17, 18 and 19 as shown more particularly in Fig. 9. The space between the terminating ends of the frame members 16, 17, 18 and 19 and the side plates 29 and 30 is closed by filler plates 31 and 32 as shown in Fig. 12. The depending ends of the plates 20a and 20b enter the block structure 33 shown more clearly in Figs. 6–8.

The block structure 33 is formed by a plurality of plates including side plates 33a and 33b and central filler plate 33c at the forward end of the block and central filler plate 33d at the rearward end of the block. The forward end of the block is formed on an incline as represented at 33c' for receiving the plowshoe blade 34. The plowshoe blade 34 cuts the narrow trench through the earth in which the pipe is to be laid.

The rear portion of the block at 33d is transversely slotted as represented at 33d' and is provided with an angularly disposed aperture 33e' therethrough into which the end of the rod member 35 is adapted to be inserted. The rod member 35 serves as a key passing through apertures formed in the end of strap 36 as represented at 37. The strap 36 forms a coupling means to the bail 38 which fastens to opposite sides of cylindrical sleeve 39. The cylindrical sleeve 39 is internally screw threaded at 40 and may receive a variety of sizes of screw threaded bushings. I have illustrated the screw threaded sleeve 39 as receiving the externally screw threaded bushing 41 which may in turn be internally screw threaded for receiving a further bushing represented at 42 in Fig. 9. The bushing which is finally effective in establishing connection with the pipe to be pulled may be smooth walled as represented in Fig. 13 at 43 for receiving the smooth cylindrical end of pipe 44 which is sweated or soldered therein or the bushing may be internally screw threaded as represented in Fig. 14 for receiving the screw threaded end 45 of the pipe to be pulled.

The coupling means controlled by rod 35 may be readily connected or disconnected by moving rod 35 with respect to bolt connection 46 with member 47 fastened to the depending member 20. Rod 35 is apertured transversely at 35a and 35b enabling bolt 46 to be attached or detached for maintaining the rod in either an elevated or lowered position under conditions where the coupling is either detached or attached.

The structure is greatly strengthened by means of the strut 48 connected to depending lug 49 on the I beam 21 and to the depending member 20 at 50.

In order to provide for the shearing of the earth as the machine is pulled through the ground, I may provide an angle member or cutting blade 51 at the leading edge or front of depending member 20 as shown more particularly in Figs. 15 and 16 whereby frictional and other obstructive forces are reduced as the machine is pulled through the earth.

By use of the equipment of my invention an incision is formed through the earth and the pipe pulled therethrough simultaneously thus rapidly completing an installation of pipe which might otherwise consume considerable periods of time and much labor.

While I have described my invention in certain of its preferred embodiments I realize that modifications may be made and I desire that it be understood that no limitations upon my invention are intended other than may be imposed by the scope of the appended claims.

What I claim as new and desire to secure by Letters Patents of the United States is as follows:

1. In a beam and tool standard connection, a beam having a central web and upper and lower integral flanges, said lower flange being slotted on each side of the central web thereof and a tool supporting depending member formed by a pair of plates secured to opposite sides of the web of said beam and extending downwardly symmetrically through the slots in said lower flange and terminating at the lower extremities in a tool, the upper extremities of said plates being formed on a bias and abutting in surface contact with the under surfaces of said upper flanges of said beam for effecting a wedging connection with the under surfaces of the upper flanges of said beam and serving to maintain the longitudinal axes of said plates at an acute angle with respect to the axis of said beam for supporting said tool in a position extending forwardly beneath said beam in the direction of pull of the beam.

2. A beam and tool standard connection as set forth in claim 1 which includes a pair of flat plate members, one of said flat plate members being disposed in contact with the outer external surface of the upper end of one of said plates and the other of said plate members being disposed in contact with the outer external surface of the other of said plates, said plate members being secured to the inside surfaces of the upper and lower flanges of said beam and providing sockets for the upper extremities of said plates and a reinforcement for said beam.

3. A beam and tool standard connection as set forth in claim 1, in which said pair of plates are fastened with the central web of said beam by a removable transversely extending headed bolt and nut connection and wherein a pair of reinforcement plate members secured between the inside surfaces of said upper and lower flanges substantially at the opposite peripheral edges of said flanges coact in conjunction with the central web for defining recesses which serve to receive the upper ends of said plates, said plate members being apertured in alignment with said headed bolt and nut connection for providing access thereto for removal and replacement of said depending plates.

References Cited in the file of this patent

UNITED STATES PATENTS

| | | |
|---|---|---|
| 115,629 | Miner | June 6, 1871 |
| 256,750 | Simonds | Apr. 18, 1882 |
| 461,172 | Porteous | Oct. 13, 1891 |
| 583,296 | Wright | May 25, 1897 |
| 665,174 | Carpenter | Jan. 1, 1901 |
| 856,200 | Allin | June 11, 1907 |
| 1,004,238 | Brooks | Sept. 26, 1911 |
| 1,022,958 | Meek | Apr. 9, 1912 |
| 1,031,123 | Kane | July 2, 1912 |
| 1,160,549 | Sweeney | Nov. 16, 1915 |
| 1,168,930 | Brown | Jan. 18, 1916 |
| 1,219,124 | MacMechen et al. | Mar. 13, 1917 |
| 1,296,574 | Wait | Mar. 4, 1919 |
| 1,362,155 | Towner | Dec. 14, 1920 |
| 1,372,357 | Leas | Mar. 22, 1921 |
| 1,693,680 | Thum | Dec. 4, 1928 |
| 1,723,985 | Richardson | Aug. 6, 1929 |
| 1,808,974 | Wilkens | June 9, 1931 |
| 1,904,666 | Sack | Apr. 18, 1933 |
| 1,930,856 | Mioton | Oct. 17, 1933 |
| 2,225,393 | Ray | Dec. 17, 1940 |
| 2,316,393 | Bloodworth | Apr. 13, 1943 |
| 2,404,518 | Moran | July 23, 1946 |
| 2,692,033 | Jaynes | Oct. 19, 1954 |

FOREIGN PATENTS

| | | |
|---|---|---|
| 554,413 | Germany | July 8, 1932 |
| 53,974 | France | Aug. 5, 1946 |
| | (Addition to No. 899,812) | |